US009681314B2

United States Patent
Broustis et al.

(10) Patent No.: US 9,681,314 B2
(45) Date of Patent: Jun. 13, 2017

(54) SELF ORGANIZING RADIO ACCESS NETWORK IN A SOFTWARE DEFINED NETWORKING ENVIRONMENT

(71) Applicant: AT&T Intellectual Property I, L.P., Atlanta, GA (US)

(72) Inventors: Ioannis Broustis, Springfield, NJ (US); Sarat Puthenpura, Berkeley Heights, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 56 days.

(21) Appl. No.: 14/718,659

(22) Filed: May 21, 2015

(65) Prior Publication Data

US 2016/0345185 A1    Nov. 24, 2016

(51) Int. Cl.
*H04W 24/00* (2009.01)
*H04W 24/02* (2009.01)
(Continued)

(52) U.S. Cl.
CPC ....... *H04W 24/02* (2013.01); *H04W 52/0206* (2013.01); *H04W 84/18* (2013.01)

(58) Field of Classification Search
CPC . H04W 24/02; H04W 24/00; H04W 36/0083; H04W 36/0094; H04W 36/18;
(Continued)

(56) References Cited

U.S. PATENT DOCUMENTS 8,406,759 B2    3/2013   Ryan et al.
8,532,029 B2    9/2013   Oh et al.
(Continued)

FOREIGN PATENT DOCUMENTS

EP    2410783 B1    5/2014
EP    2819461 A1    12/2014
(Continued)

OTHER PUBLICATIONS

"Self Organizing Networks (SON): Going Beyond Mobile Network Automation," Telecom Review, http://www.telecomreviewna.com/index.php?option=com_content&view=article&id=514:self-organizing-networks-son-going-beyond-mobile-network-automa, Last accessed Mar. 15, 2015.
(Continued)

*Primary Examiner* — Mohamed Kamara
(74) *Attorney, Agent, or Firm* — Amin, Turocy & Watson, LLP

(57) ABSTRACT

A self organizing network within a software defined networking environment is provided to allow for fast updating of radio access network parameters which enables optimization algorithms to converge on optimized configurations very quickly. The self organizing network is enabled by providing a self organizing network manager plug-in within a software defined networking environment that interfaces with a radio access network plug-in via a service abstraction layer to quickly obtain base station device parameters, iteratively adjust the base station device parameters to obtain optimized radio access network configurations to mitigate outages, reduce power consumption, manage load, or provide other benefits.

20 Claims, 10 Drawing Sheets

(51) Int. Cl.
*H04W 52/02* (2009.01)
*H04W 84/18* (2009.01)

(58) Field of Classification Search
CPC ..... H04W 36/22; H04W 36/24; H04W 4/005; H04W 4/006; H04W 4/008; H04W 52/0206; H04W 84/18
See application file for complete search history.

(56) References Cited

U.S. PATENT DOCUMENTS

| | | | |
|---|---|---|---|
| 8,660,547 B2 | 2/2014 | Marin | |
| 8,780,732 B2 | 7/2014 | Song et al. | |
| 8,798,525 B2 | 8/2014 | Kazmi et al. | |
| 8,855,625 B2 | 10/2014 | Tipton et al. | |
| 8,861,494 B2 | 10/2014 | Mukhopadhyay | |
| 8,983,453 B1* | 3/2015 | On | H04W 24/02 370/252 |
| 9,060,289 B2* | 6/2015 | Chandrasekhar | H04W 24/02 |
| 9,113,352 B2* | 8/2015 | Agarwal | H04W 24/02 |
| 2009/0069007 A1* | 3/2009 | Xiao | H04W 24/10 455/424 |
| 2010/0136985 A1* | 6/2010 | Inoue | H04W 16/08 455/446 |
| 2010/0299419 A1 | 11/2010 | Ramankutty et al. | |
| 2011/0252477 A1 | 10/2011 | Sridhar et al. | |
| 2012/0213149 A1* | 8/2012 | Chakraborty | H04W 52/365 370/328 |
| 2013/0272132 A1 | 10/2013 | Heo et al. | |
| 2014/0031006 A1 | 1/2014 | Moore et al. | |
| 2014/0293979 A1* | 10/2014 | Gormley | H04W 24/02 370/338 |
| 2014/0376374 A1 | 12/2014 | Moser et al. | |
| 2014/0378148 A1 | 12/2014 | Moser et al. | |
| 2015/0043386 A1 | 2/2015 | Racz et al. | |
| 2015/0043512 A1* | 2/2015 | Jeong | H04W 28/06 370/329 |
| 2015/0050925 A1 | 2/2015 | Tapia | |
| 2015/0052251 A1 | 2/2015 | Ryan et al. | |
| 2015/0071145 A1 | 3/2015 | Lindstrom | |

FOREIGN PATENT DOCUMENTS

| | | |
|---|---|---|
| WO | 2010096992 A1 | 9/2010 |
| WO | 2011018104 A1 | 2/2011 |
| WO | 2014146690 A1 | 9/2014 |

OTHER PUBLICATIONS

Akrabs, et al., "SOFROP: Self-Organizing and Fair Routing Protocol for Wireless Networks with Mobile Sensors and Stationary Actors," School of Electrical Engineering and Computer Science, Univ. of Central Florida, FL, 2010.

"Motorola LTE Self Organizing Networks," Brocure, Motorola, motorolasolutions.com, http://www.motorolasolutions.com/web/Business/Broducts/LTE/Documents/StaticFiles/LTE%20SON%20Brochure.pdf, last accessed Mar. 15, 2015.

"GEOson: Customer Centric Self Optimizing Networks," ariesco.com, http://www.ariesco.com/products/applications/geo-son/, last accessed Mar. 15, 2015.

"Intelligent Self Organizing Networks (iSON)," Nokia, networks.nokia.com, http://networks.nokia.com/portfolio/solutions/self-organizing-networks, last accessed Mar. 15, 2015.

"SingleSON," Huawei, huawei.com, http://www.huawei.com/en/solutions/broader-smarter/hw-104610-son-multi-mode-o.htm, last accessed Mar. 15, 2015.

"Cisco Quantum SON Suite," Cisco, Cisco.com, http://www.cisco.com/c/en/us/products/wireless/quantum-son-suite/index.html, last accessed Mar. 15, 2015.

"Amdocs Self-Optimizing Networks," amdocs, amdocs.com, http://www.amdocs.com/products/network-optimization/pages/self-optimizing-networks.aspx, last accessed Mar. 15, 2015.

"Real-Time SON," Optulink: Optimizing Networks, Optulink,com, http://optulink.com/solutions-real-time-mobile-voice-optimization/real-time-son/, last accessed Mar. 15, 2015.

\* cited by examiner

SELF ORGANIZING RADIO ACCESS NETWORK IN A SOFTWARE DEFINED NETWORKING ENVIRONMENT

TECHNICAL FIELD

The subject disclosure relates to a self organizing network (SON) for a radio access network in a software defined networking environment.

BACKGROUND

A self organizing network is a class of automation technology that is designed to make planning, configuration, management, optimization and healing of mobile radio access networks simpler and faster. SON is typically designed to operate in a fully automated, closed-loop manner. For SON to work efficiently, however, accurate, real time information from the radio access network is used to perform radio network optimization. Current techniques for retrieving base station parameters from the radio access network are slow and may consume many minutes to update with new information. Converging on an optimized radio access network solution over many iterations may be delayed for a long time as updated network parameters are retrieved.

DETAILED DESCRIPTION

Figure 1:
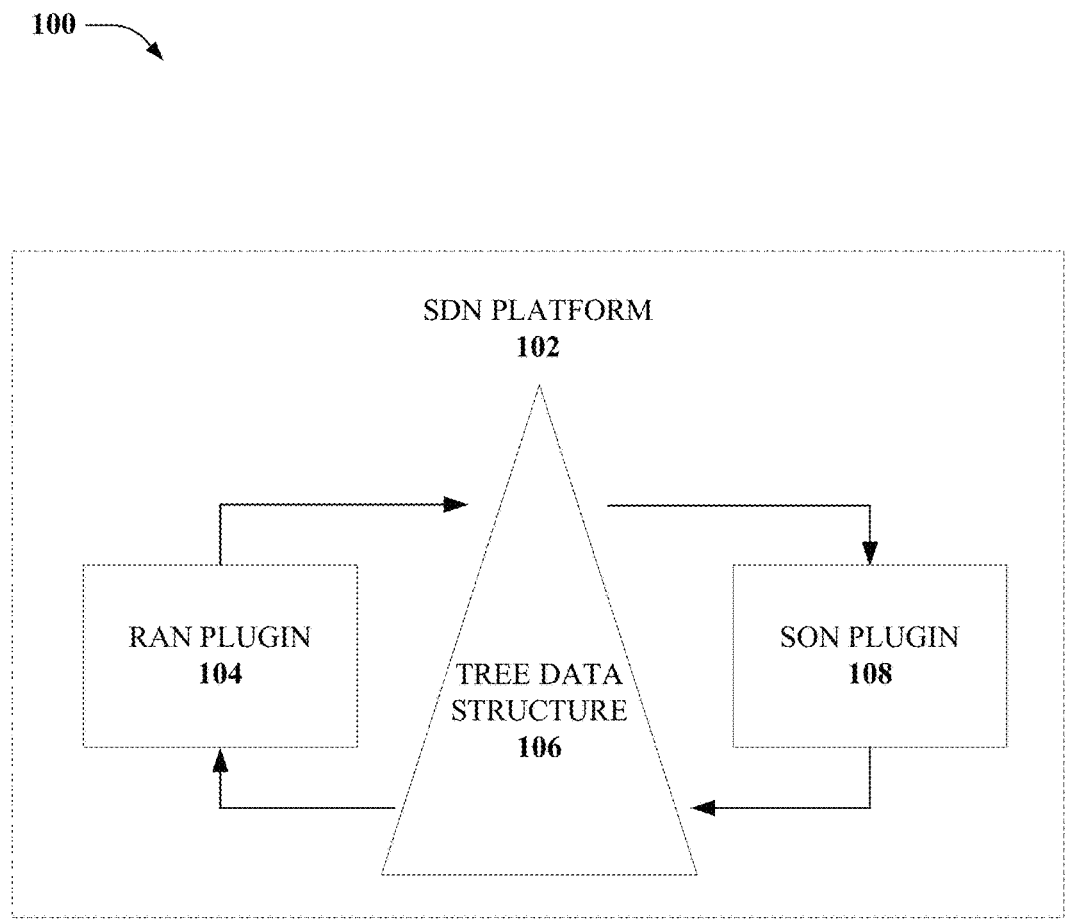
FIG. 1 is an example, non-limiting embodiment of a block diagram showing an update algorithm for a self organizing network in a software defined networking environment in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A self organizing network within a software defined networking environment is provided to allow for fast updating of radio access network parameters which enables optimization algorithms to converge on optimized configurations very quickly. The self organizing network is enabled by providing a self organizing network manager plug-in within a software defined networking environment that interfaces with a radio access network plug-in via a service abstraction layer to quickly obtain base station device parameters, iteratively adjust the base station device parameters to obtain optimized radio access network configurations to mitigate outages, reduce power consumption, manage load, and provide other benefits.

The plug-ins can be modules that can be activated within a software defined networking platform. As an example, the radio access network plug-in and self organizing network manager plug-in can be plug-ins within a software defined networking platform such as Open Daylight from the Open Daylight Project. In other embodiments, the plug-ins can be used with different software defined networking platforms. The plug-ins can interact with existing plug-ins, modules, and components in order to provide functionality directed towards the radio access network optimizations disclosed herein.

The self organizing network manager plug-in can run the self-organization algorithms for network auto-reconfiguration by interfacing with other software defined networking (SDN) plug-in and external applications. As an example the self organizing network manager plug-in can use a northbound communication interface to be used for communications between the self organizing network manager plug-in and the network, to collect information from the network within the scope of a SON algorithm. The self organizing network manager plug-in can also interface internally with a topology manager and inventory in order to obtain network element and topology information. The self organizing network manager plug-in can also communicate with a south bound communication using a service abstraction layer to configure devices based on the output of the self organizing network manager plug-in.

For these considerations as well as other considerations, in one or more embodiments, a system comprises a processor and a memory that stores executable instructions that when executed by the processor, facilitate performance of operations, comprising receiving a parameter of a base station device from the base station device and updating a tree data structure associated with the parameter. The operations also comprise modifying the parameter resulting in a modified parameter and updating the tree data structure with the modified parameter. The operations also comprise transmitting the modified parameter to the base station device.

In another embodiment, a method comprises updating, by a device comprising a processor, a tree structure with a first operational parameter of a first base station device. The method comprises modifying, by the device, the first operational parameter, based on a selected optimization plug-in, resulting in a modified operational parameter. The method also comprises updating, by the device, the tree structure with the modified operational parameter.

In another embodiment, a computer-readable storage device storing executable instructions that, in response to execution, cause a device comprising a processor to perform operations comprising updating a tree structure with an operational parameter of a base station device. The operations also comprise modifying the operational parameter, based on a selected optimization plug-in, resulting in a modified operational parameter. The operations further comprise updating the tree structure with the modified operational parameter and transmitting the modified operational parameter to the base station device.

Turning now to FIG. 1, illustrated is an example, non-limiting embodiment of a block diagram 100 showing a update algorithm for a self organizing network in a software defined networking environment in accordance with various aspects described herein.

A mobile broadband network generally comprises a radio access network that facilitates communications between the mobile devices and a core network. In the case of Long Term Evolution ("LTE") networks and other 3rd Generation Partnership Project ("3GPP") compliant networks (e.g., LTE Advanced) and even non-3GPP systems such as WiMAX and CDMA2000, these networks are the radio access network and an evolved packet core network that can contain a series of components that provide mobile data and control management. The self organizing network manager disclosed herein can be utilized in any mobile network that may include a software defined networking platform for radio access network optimization, although for the ease of simplicity, reference throughout this application will made to LTE and related networks.

The radio access network can include one or more base station devices (Evolved Node B in the case of LTE networks) that are the hardware connected to the mobile phone network that communicate directly with mobile devices. These base station devices can be configured to change the transmission power, tilt, frequency, directional output, load, and etc. When changes are made, the radio access network controller can determine the result of the changes, and then make more modifications. Converging on an optimum solution to whatever the radio access network issues are, can take multiple iterations of slight modifications as there may be too many factors to easily calculate an optimum solution ab initio.

In the embodiment shown in FIG. 1, an improved system for updating the self organizing network with base station device parameters and distributing the modified parameters to the base station devices is shown. In a software defined networking platform 102, a self organizing network plug-in 108 can contain one or more modules that can facilitate optimization algorithms for a radio access network. The optimization modules can include modules to manage the power consumption of the base station devices, modules to mitigate cell tower/base station device outages, and other modules.

A tree data structure 106 is provided to store the latest base station device parameters and configuration information. The tree data structure 106 can be provided within a service abstraction layer of the SDN platform 102. The tree data structure 106 can store the configuration information associated with the radio access network. The configuration information can include base station settings, operational parameters, and other information associated with each base station device in a radio access network. A RAN plug-in 104 can interface with the base station devices in the radio access network, and at predetermined intervals, obtain the configuration information and other parameters from the base station devices and update the tree data structure 106 with the parameters. The SON plug-in 108 can then access the base station device parameters from the tree data structure 106, perform modifications to the parameters with one or more of the optimization modules, and then update the tree data structure 106 with the modified base station device parameters. RAN plug-in 104 can then access the modified base station device parameters from the tree data structure 106 and distribute the modified parameters to the base station devices in the radio access network.

At predetermined intervals (e.g., every minute) the RAN plug-in 104 can obtain the configuration information from the base station devices in the radio access network, and the process can repeat itself with updated information in each iteration. Over multiple iterations, the SON plug-in 108 can provide modified base station device parameters that eventually converge on an optimal solution for power consumption, outage mitigation, or other optimization tasks.

In an embodiment, the SON plug-in 108 can use a northbound communication interface to be used for communications between the SON plug-in 108 and the core network. In this way, the SON plug-in 108 can measure the impact of the modifications to the base station device parameters by collecting measurement report information and other parameters from mobile devices communicating with the radio access network.

In an embodiment, the SON plug-in 108 can also receive instructions from the core network via the northbound communication interface to activate or deactivate optimization modules/algorithms within the SON plug-in 108. For instance, a cell tower outage mitigation module might normally be inactive, but when the core network determines that a cell tower has gone offline, either due to a planned event (e.g., maintenance, etc) or due to an unexpected outage, the core network can send an instruction to the SON plug-in 108 via the northbound communication interface to activate the outage mitigation module. Likewise, if there is an event or set of circumstances that may trigger power consumption optimization, the core network can send an instruction to the SON plug-in 108 to activate the power consumption module.

In other embodiments, the SON plug-in 108 can determine from the base station device parameters stored in the tree data structure 106 whether or not to activate one or more optimization modules. For instance, SON plug-in 108 can determine that a base station device has gone offline, or whether increased load on one or more base station devices may trigger configuration changes to the radio access network and activate and/or enable the relevant modules.

Figure 2:
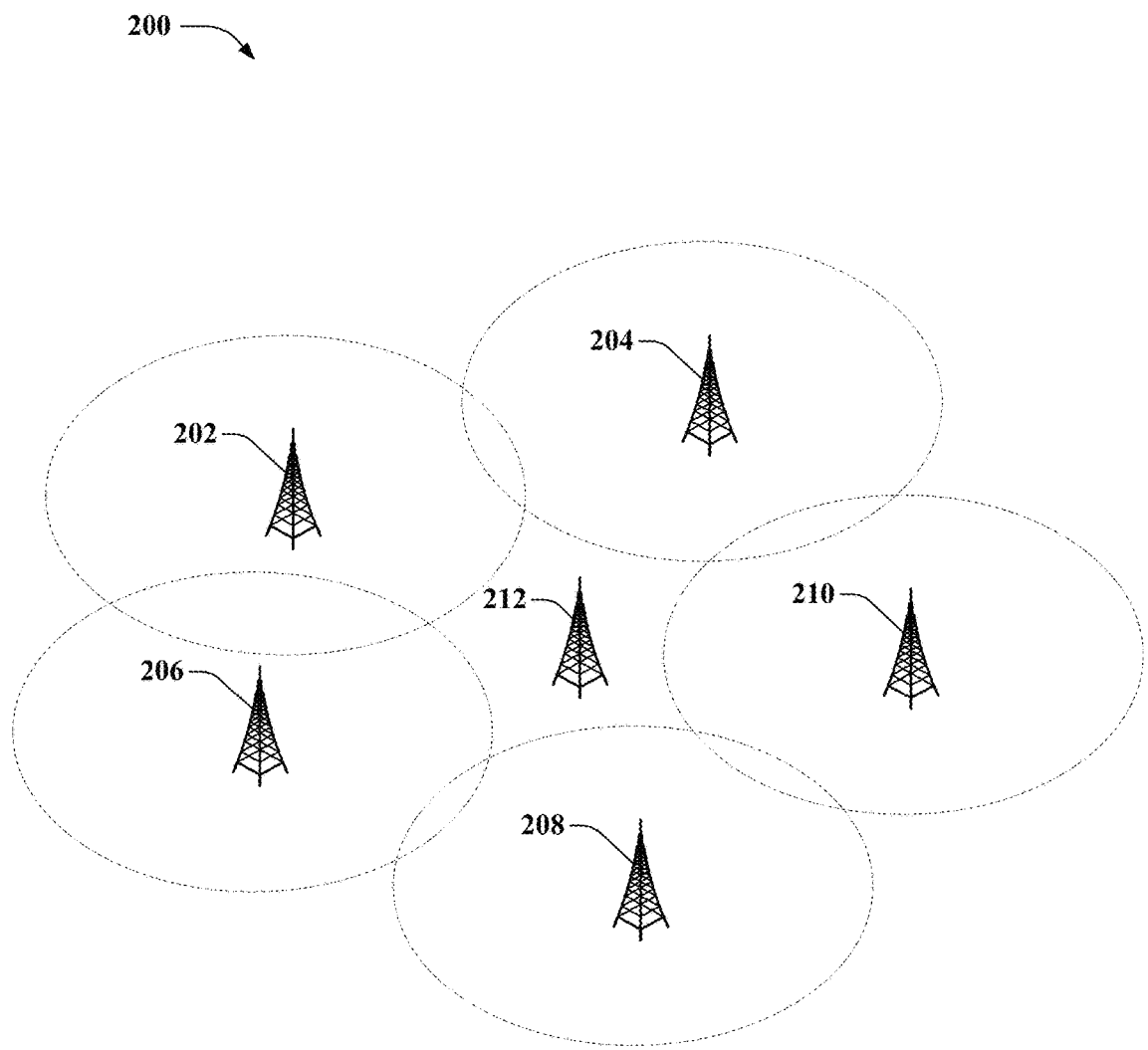
FIG. 2 is an example, non-limiting embodiment of a cell tower outage mitigation optimization in accordance with various aspects described herein.

Turning now to FIG. 2, illustrated is an example, non-limiting embodiment of a cell tower outage mitigation optimization 200 in accordance with various aspects described herein. In this exemplary embodiment, base station devices 202, 204, 206, 208, 210, and 212 are base station devices forming a part of a radio access network and base station device 212 has gone offline. Base station device 212 can have gone offline either due to a planned event (e.g., maintenance, etc) or due to an unexpected outage (device failure, lack of power, etc). The self organizing network plug-in (e.g., SON plug-in 108) in the SDN platform (e.g., SDN platform 102), can determine that base station device 212 has gone offline. The SON plug-in can determine that the base station device 212 has gone offline based on an instruction received from a core network, or based on base station device parameters received via a RAN plug-in (e.g., RAN plug-in 104) at a database (e.g., tree data structure 106).

The SON plug-in can iteratively adjust the configuration settings and operational parameters of base station devices 202, 204, 206, 208, and 210 to account for the coverage loss of base station device 212. Over multiple iterations, configuration settings such as power, directional output, and other settings can be adjusted, and base station devices 202, 204, 206, 208, and 210 can effectively cover for base station device 212. As the database in the software defined networking platform can be updated with the real-time configuration settings very quickly, the radio access network can converge on a solution within just a few minutes.

Figure 3:
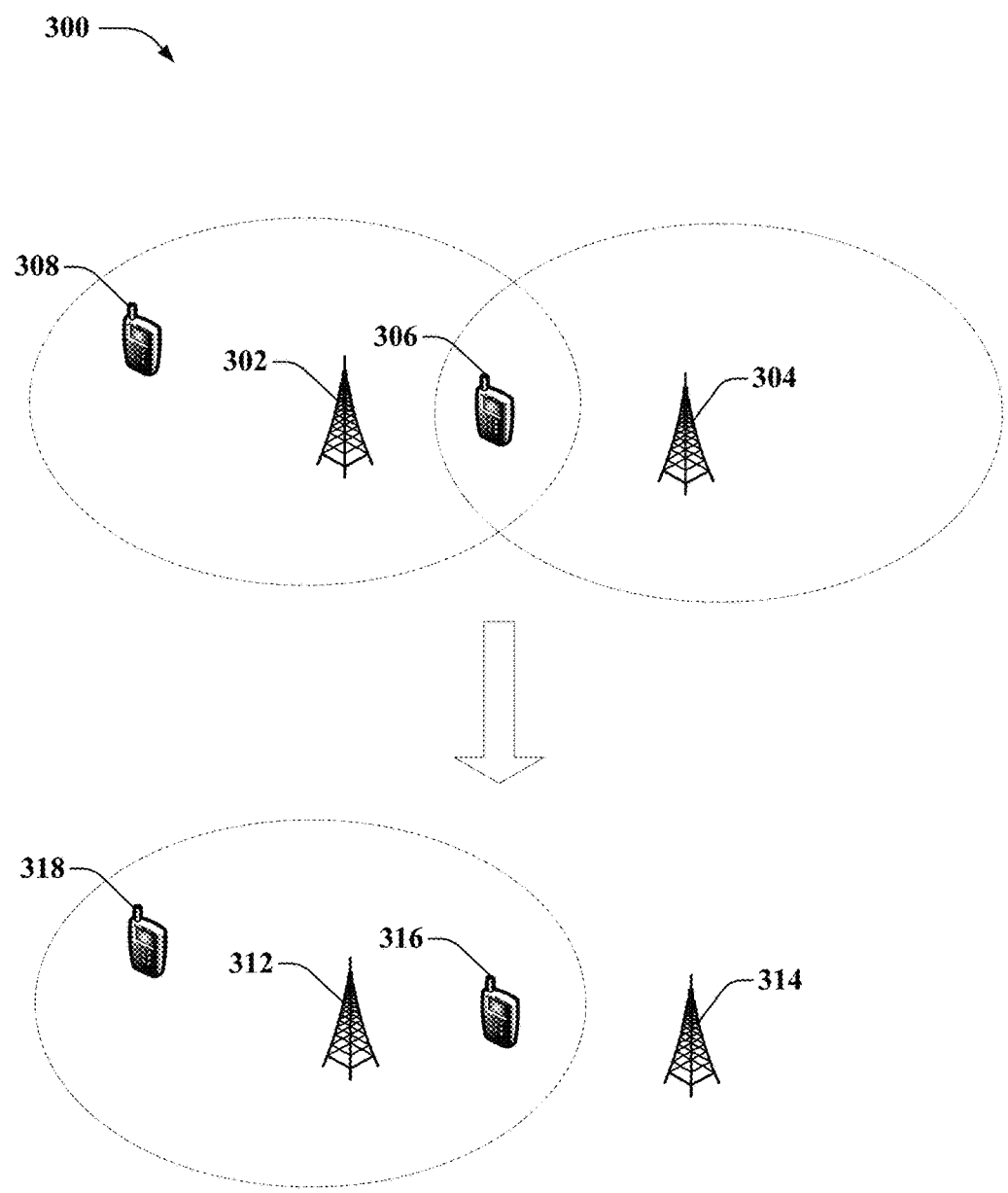
FIG. 3 is an example, non-limiting embodiment of a cell tower power reduction optimization in accordance with various aspects described herein.

Turning now to FIG. 3, illustrated is an example, non-limiting embodiment of a cell tower power reduction optimization 300 in accordance with various aspects described herein. In this exemplary embodiment, base station devices 302 and 304 can provide service for mobile devices 306 and 308 in an area. The self organizing network plug-in (e.g., SON plug-in 108) in the SDN platform (e.g., SDN platform 102), can determine that some modifications to the operational parameters of base station devices 302 and 304 can be made in order to reduce power. Specifically, in the embodiment shown in 300, base station device 302 can service mobile devices 306 and 308 while base station device 304 may not be required.

The SON plug-in can iteratively adjust the configuration settings and operational parameters of base station devices 302 and 304 and eventually, after multiple rounds of iterations, the radio access network can result in base station device 312 servicing both mobile devices 316 and 318 while base station device 314 can be power down. It is to be appreciated that this is merely an exemplary embodiment, and that in other embodiments, instead of powering down, the power may be reduced, the directionality or shape of the cellular footprint can be adjusted, mobile devices can be handed over to neighboring base station devices, and other adjustments can be made.

Figure 4:
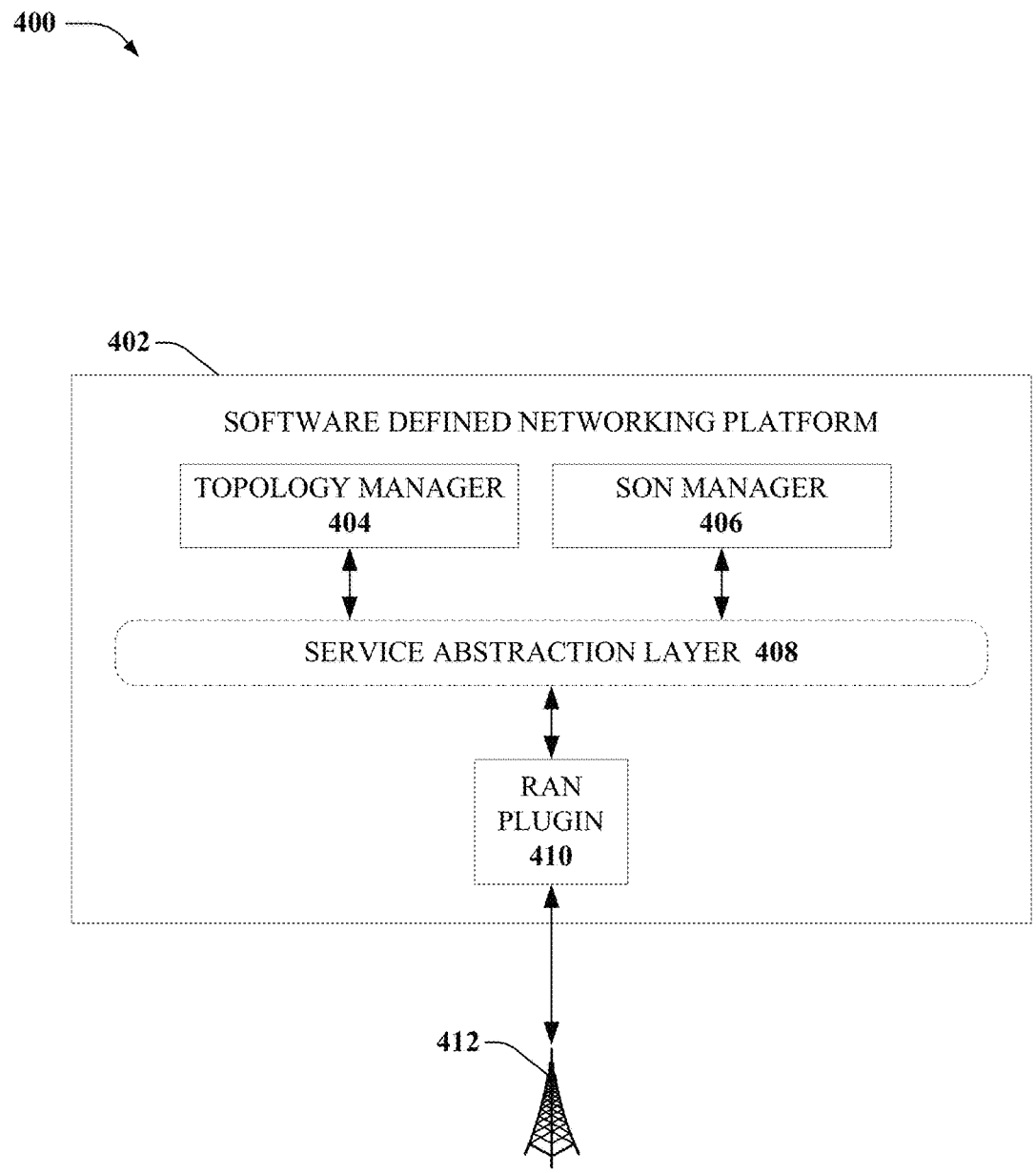
FIG. 4 is an example, non-limiting embodiment of a block diagram showing a self organizing network in a software defined networking environment in accordance with various aspects described herein.

Turning now to FIG. 4, illustrated is an example, non-limiting embodiment of a block diagram 400 showing a self organizing network in a software defined networking platform 402 in accordance with various aspects described herein. In an embodiment, SDN platform 402 can be a standardized SDN platform that can have one or more specialized or custom modules in order to effectuate SON algorithms. In an embodiment SDN platform 402 can include a service abstraction layer 408 that facilitates communications between higher level plug-ins and plug-ins that communicate with devices. In an embodiment, the service abstraction layer 408 can facilitate communications between the RAN plug-in 410 which interfaces with the radio access network (e.g., base station device 412) and plug-ins such as a SON manager 406 and a topology manager 404. The RAN plug-in 410 can update a tree structure associated with the service abstraction layer 408 with operational parameters and configuration settings of the base station device 412. Once the parameters and settings are stored in the tree structure, the SON manager 406 can implement one or more optimization algorithms and make adjustments to the parameters and the RAN plug-in 410 can distribute those modified parameters to the base station device 412.

In an embodiment, the SON manager 406 can interface with the topology manager 404 in order to obtain network element and topology information. The topology manager 404 can contain information identifying the base station device 412, its location, as well as its context within a radio access network and its relationship to other base station devices. SON manager 406 can use this information when performing the optimizations and modifications to the parameters, so that the adjustments to the parameters associated with base station device 412 do not negatively affect the radio access network as a whole or other neighboring base station devices. The accurate, real-time topology information can be used by the SON manager 406 to make parameter tuning decisions. As an example, the SON manager 406 can use the topology information provided by the topology manager 404 to manage interference, by determining which base station devices are neighbors, what frequency they are broadcasting on, and etc., in order to perform power control for interference coordination (e.g., LTE Inter-Cell Interference Coordination).

In an embodiment, the SON manager 406 can be implemented in a controller platform of the SDN platform 402 using JAVA or other suitable technologies. The SON manager 406 can inherit all the interface attributes and utilities of other already implement controller management modules. The SON manager 406 can use Open Daylight REST API layer to communicate with application and other user defined cloud network/enhanced control, orchestration, management, and policy (UDNC/ECOMP) components. This interface can be used for communication between the SON manager 406 and e.g., data collection, analysis event components, for obtaining information about an event that was detected in the network within the scope of a specific input of a SON algorithm.

Figure 5:
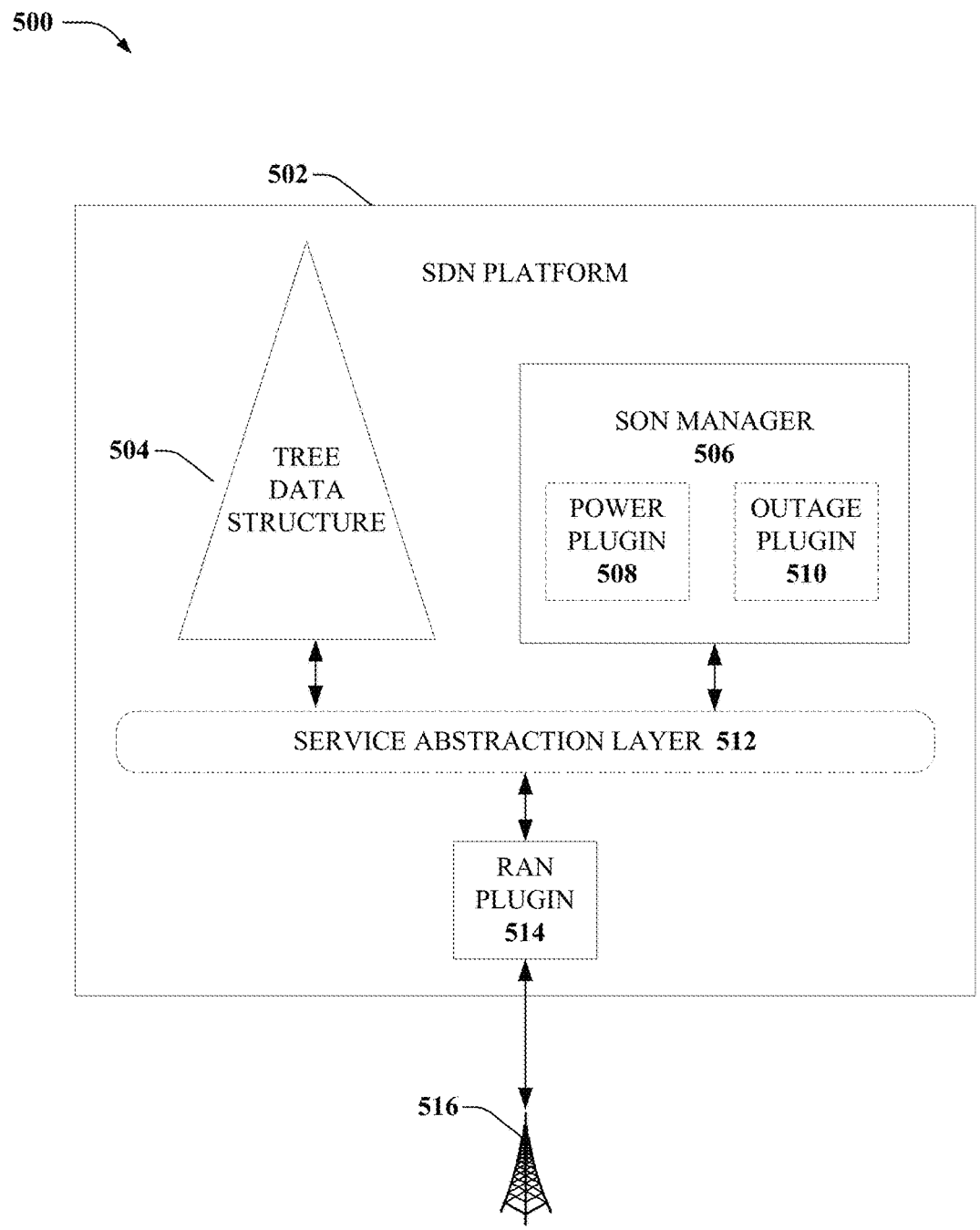
FIG. 5 is an example, non-limiting embodiment of a block diagram showing a self organizing network in a software defined networking environment in accordance with various aspects described herein.

Turning now to FIG. 5, illustrated is an example, non-limiting embodiment of a block diagram 500 showing a self organizing network in a software defined networking platform 502 in accordance with various aspects described herein In an embodiment, SDN platform 502 can be a standardized SDN platform that can have one or more specialized or custom modules in order to effectuate SON algorithms. In an embodiment SDN platform 502 can include a service abstraction layer 512 that facilitates communications between higher level plug-ins and plug-ins that communicate with devices. In an embodiment, the service abstraction layer 512 can facilitate communications between the RAN plug-in 514 which interfaces with the radio access network (e.g., base station device 516) and plug-ins such as a SON manager 506. The RAN plug-in 514 can update a tree data structure 504 with operational parameters and configuration settings of the base station device 516. Once the parameters and settings are stored in the tree data structure 504, the SON manager 506 can implement one or more optimization plug-ins (e.g., power plug-in 508 and/or outage plug-in 510, among other plug-ins) and make adjustments to the parameters, save them to the tree data structure 504 and the RAN plug-in 514 can distribute those modified parameters to the base station device 516.

In an embodiment, the SON manager 506 can also receive instructions from the core network via a northbound communication interface to activate or deactivate one or more of power plug-in 508 or outage plug-in 510. For instance, the outage plug-in 510 might normally be inactive, but when the core network determines that a cell tower or base station device has gone offline, either due to a planned event (e.g., maintenance, etc) or due to an unexpected outage, the core network can send an instruction to the SON manager 506 via the northbound communication interface to activate the outage plug-in 510. Likewise, if there is an event or set of circumstances that may trigger power consumption optimization, the core network can send an instruction to the SON manager 506 to activate the power plug-in 508.

In other embodiments, the SON manager 506 can determine from the base station device parameters stored in the tree data structure 504 whether or not to activate one or more of the optimization plug-ins. For instance, SON manager 506 can determine that a base station device has gone offline, or whether increased load on one or more base station devices may trigger configuration changes to the radio access network and activate and/or enable the relevant plug-ins.

Figure 6:
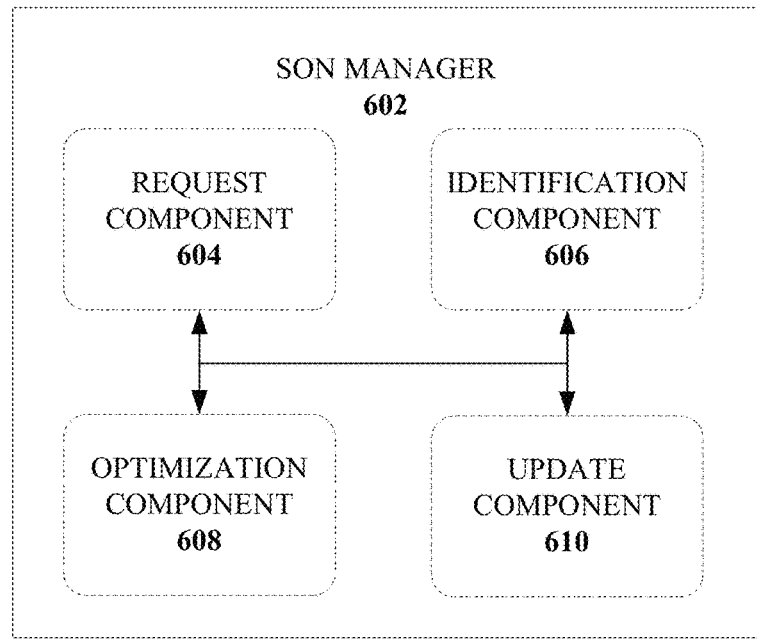
FIG. 6 is an example, non-limiting embodiment of a block diagram showing a self organizing network manager in a software defined networking environment in accordance with various aspects described herein.

Turning now to FIG. 6, illustrated is an example, non-limiting embodiment of a block diagram 600 showing a self organizing network manager 602 in a software defined networking environment in accordance with various aspects described herein.

SON manager 602 can include a request component 604 that retrieves base station device parameters from a tree data structure. Request component 604 can retrieve the base station device parameters at predetermined intervals or in response to an optimization plug-in/algorithm being initiated.

Identification component 606 can determine which base station device the parameters are associated with by interfacing with a topology manager that comprises topology information associated with network elements and also relationship information identifying associated base station devices.

Optimization component 608 can modify the base station device parameters according to one or more optimization algorithms in order to adjust the radio access network according to one or more goals. For instance, the optimization component 608 can adjust the base station device parameters to mitigate a cell tower outage, or to reduce power consumption, or for some other end. Update component 610 can then update the tree data structure with the modified base station device parameters.

The request component 604 can also include an input data collector that communicates with the applications and ECOMP components that feed the SON algorithms with network data and directives. The request component 604 and identification component 606 can include interfaces that communicate with the topology manager, and other management entities within the SDN platform and the service abstraction environment.

The optimization component 608 can include a internal SON algorithmic engine that has a collection of SON algorithms that obtain network data to provide configuration suggestions. In an embodiment, the SON manager 602 can also include a internal SON database or tree structure that provides temporary network parameter value storage. The update component 610 can then include a SON decision enforcer that feeds configuration change requests to service abstraction layer plug-ins. In an embodiment, the SON manager 602 can iteratively repeat the process until the SON algorithm converges to an acceptable state. Depending on decisions that are potentially made by ECOMP, other controller functions or other applications, the north-bound interface or other interfaces can be used for instructing the optimization component 608 to perform certain actions, such as: stop making decisions, restart using new data, skip an iteration, or other actions.

Figure 7:
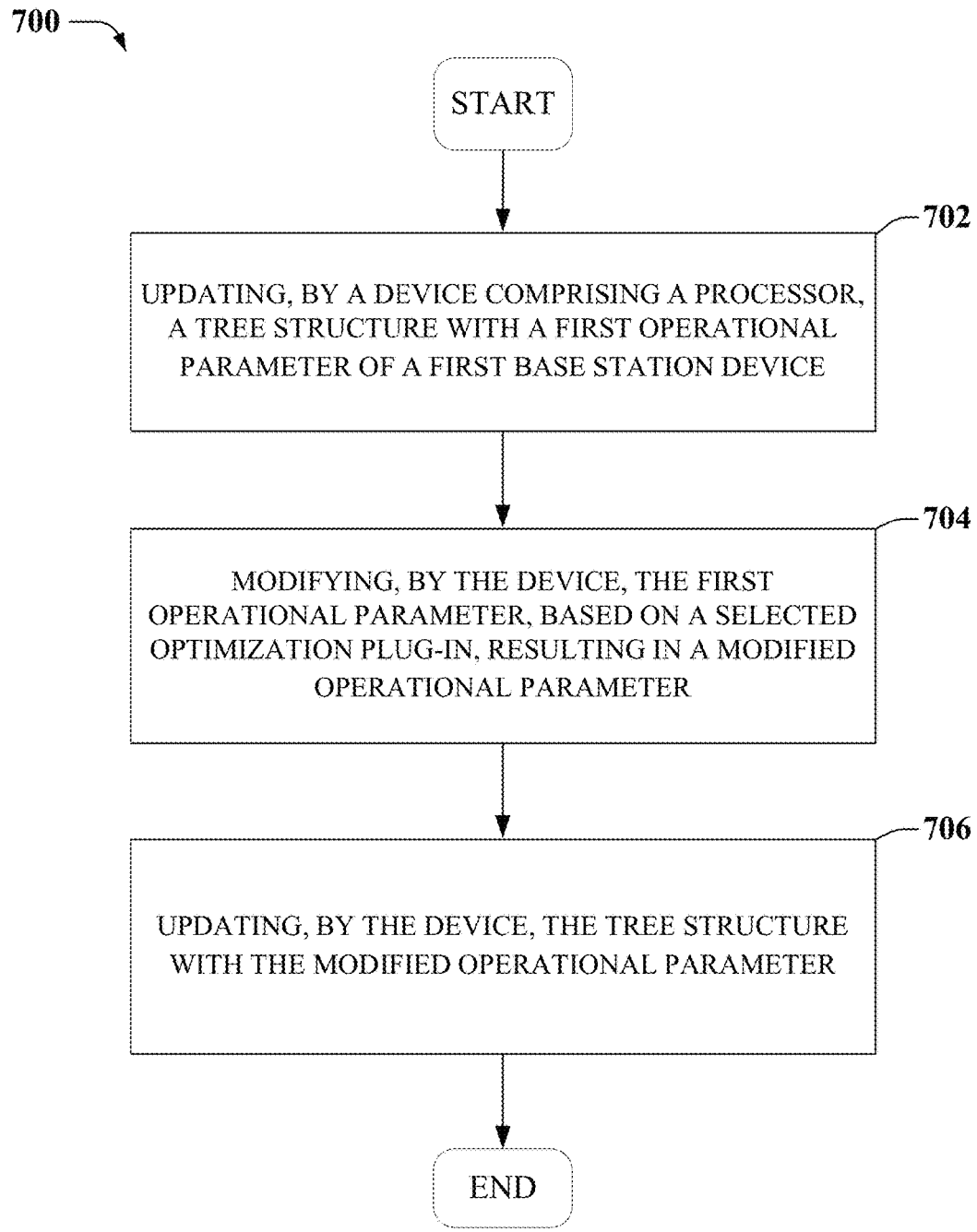
FIG. 7 illustrates a flow diagram of an example, non-limiting embodiment of a method for utilizing a self organizing network in a software defined networking environment as described herein.
Figure 8:
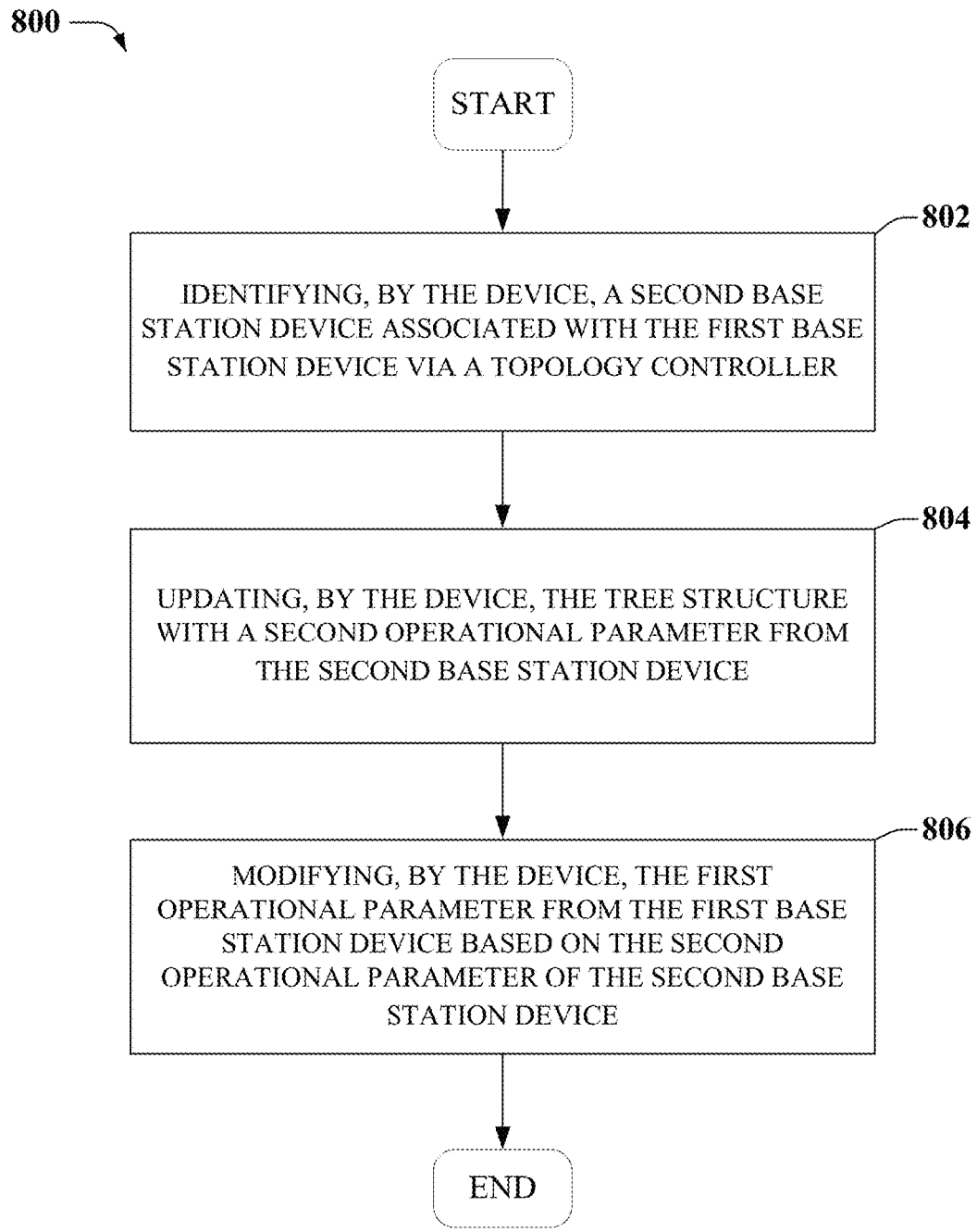
FIG. 8 illustrates a flow diagram of an example, non-limiting embodiment of a method for utilizing a self organizing network in a software defined networking environment as described herein.

FIGS. 7-8 illustrates a process in connection with the aforementioned systems. The processes in FIGS. 7-8 can be implemented for example by the systems in FIGS. 1-6. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram 700 of an example, non-limiting embodiment of a method for utilizing a self organizing network in a software defined networking environment as described herein.

The method 700 can begin at 702 where the method comprises updating, by a device comprising a processor, a tree structure with a first operational parameter of a first base station device.

At 704, the method can include modifying, by the device, the first operational parameter, based on a selected optimization plug-in, resulting in a modified operational parameter.

At 706, the method can include updating, by the device, the tree structure with the modified operational parameter.

FIG. 8 illustrates a flow diagram 800 of an example, non-limiting embodiment of a method for utilizing a self organizing network in a software defined networking environment as described herein.

The method 800 can begin at 802 where the method comprises identifying, by the device, a second base station device associated with the first base station device via a topology controller.

At 804, the method can include updating, by the device, the tree structure with a second operational parameter from the second base station device.

At 806, the method can include modifying, by the device, the first operational parameter from the first base station device based on the second operational parameter of the second base station device.

Figure 9:
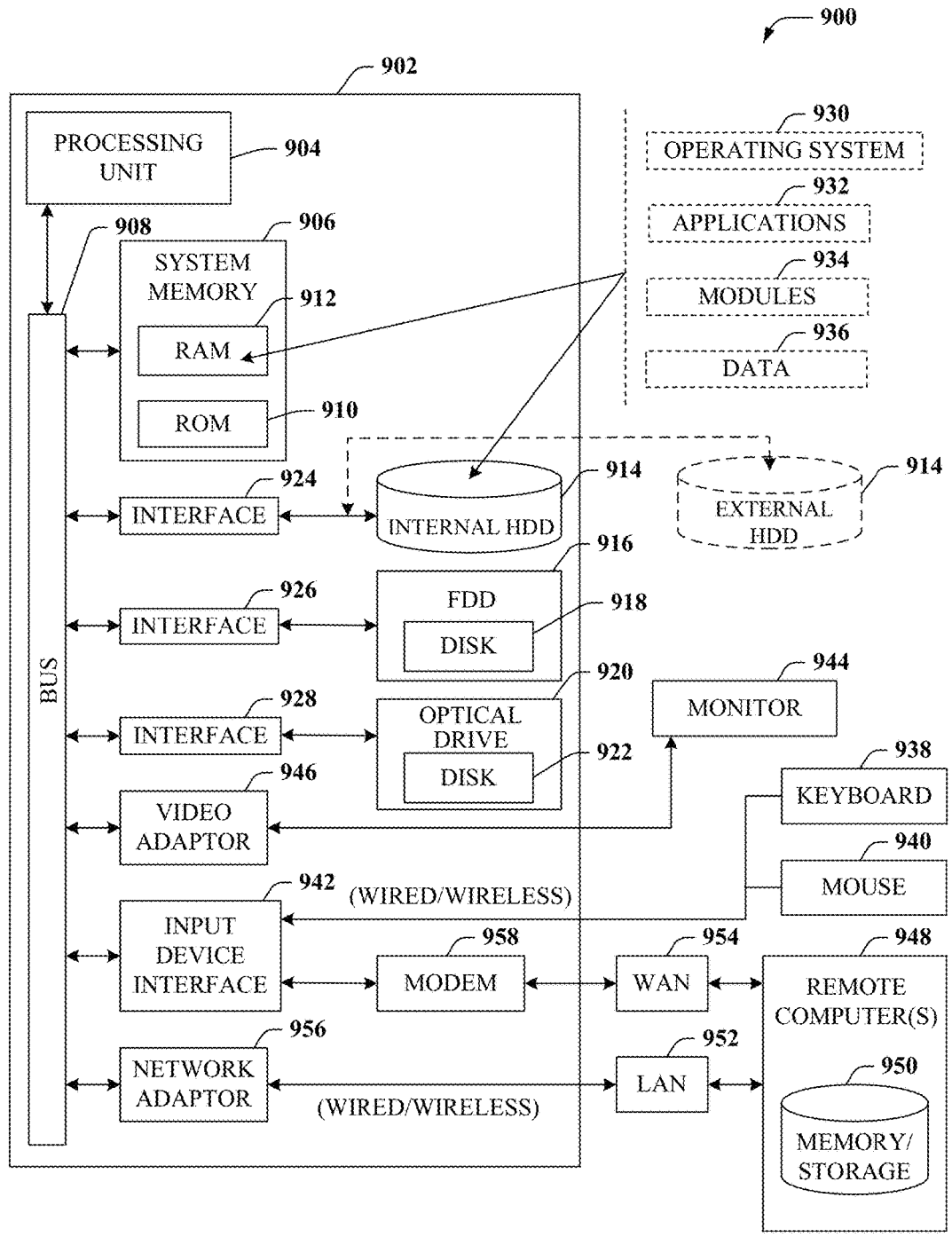
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

In an embodiment of the subject application, the computer 1002 can provide the environment and/or setting in which one or more of the cloud EPCs disclosed in FIGS. 1-8 can be operated from. For instance, the virtual machines disclosed herein can be applications 932 stored in hard drive 914 and executed by processing unit 904.

Figure 10:
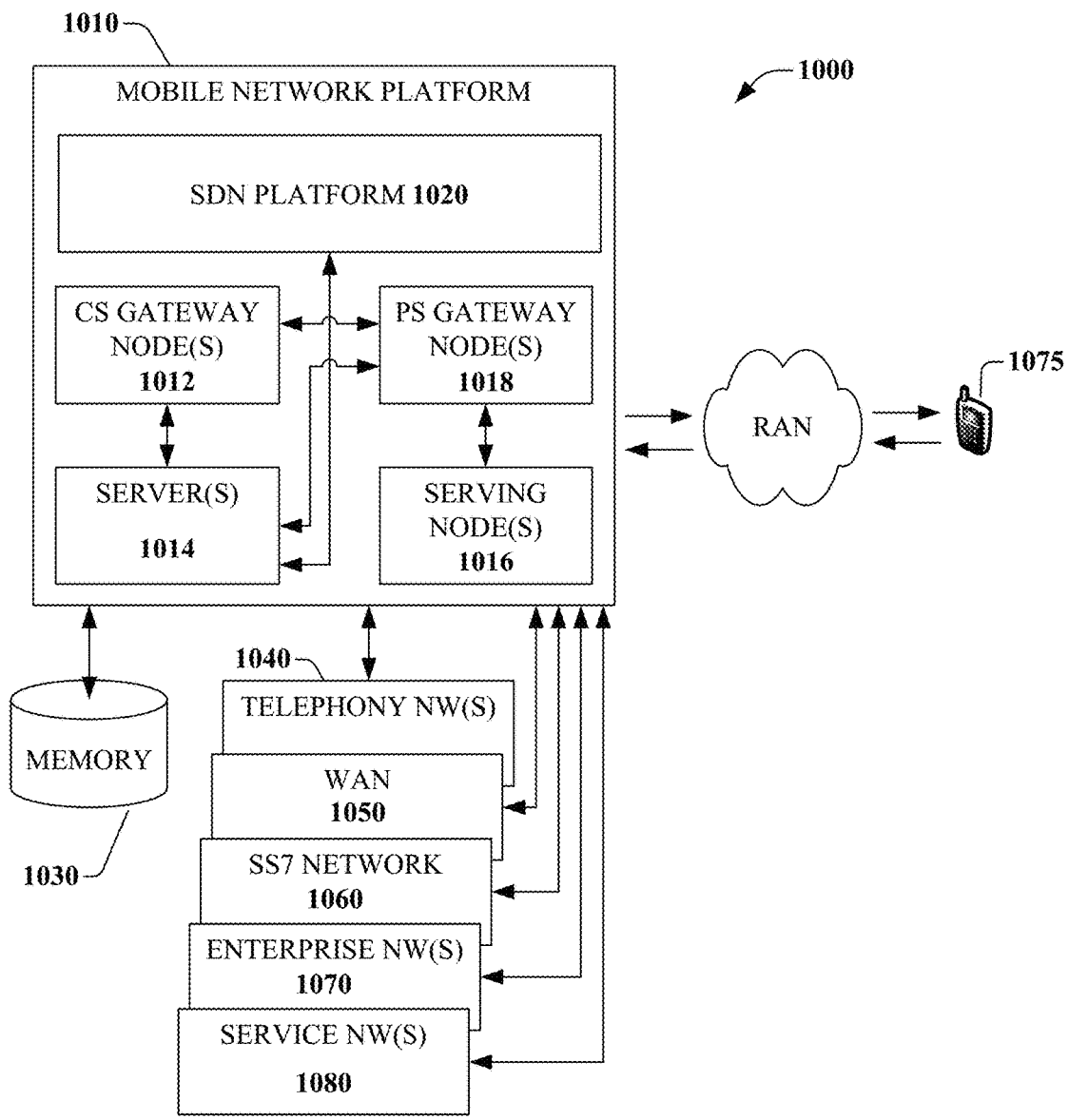
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication. Mobile network platform 1010 can also include the MMEs, HSS/PCRFs, SGWs, and PGWs disclosed herein. In an embodiment, mobile network platform 1010 can also include a software defined networking platform 1020 (e.g., SDN platform 102, 402, 502, etc) that can include SON manager plug-ins to manage the radio access network that provides connectivity to UE 1075

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s)

1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIGS. 9 and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
 a processor; and
 a memory that stores executable instructions that, when executed by the processor, facilitate performance of operations, comprising:
  receiving a parameter of a base station device from the base station device;
  updating a tree data structure with the parameter;
  selecting an optimization module from optimization modules of a self organizing network plug-in based on the parameter;
  activating the optimization module resulting in an activated optimization module;
  modifying the parameter using the activated optimization module resulting in a modified parameter;
  updating the tree data structure with the modified parameter; and
  transmitting the modified parameter to the base station device.

2. The system of claim 1, wherein the receiving comprises:
 receiving the parameter from the base station device via a radio access network plug-in that identifies the base station device using a topology controller of a service abstraction layer of the system.

3. The system of claim 2, wherein the topology controller identifies base station devices associated with the base station device, and the radio access network plug-in collects parameters associated with the base station devices.

4. The system of claim 3, wherein the modified parameter is based on the parameters.

5. The system of claim 1, wherein the self organizing network plug-in is part of a service abstraction layer of the system.

6. The system of claim 1, wherein the operations further comprise:
 in response to receiving an instruction from a network controller indicating an event occurring on a network device of a network with which the base station device is authorized to communicate, deactivating the activated optimization module.

7. The system of claim 1, wherein the modified parameter results in a reduction in power consumption of the base station device.

8. The system of claim 1, wherein the modified parameter results in a change in cellular coverage of the base station device.

9. The system of claim 1, wherein the receiving the parameter is in response to a request for the parameter that was sent to the base station device.

10. The system of claim 1, wherein the tree data structure is iteratively updated with a new parameter of the base station device according to a predetermined interval of time.

11. The system of claim 10, wherein the predetermined interval of time is less than a minute.

12. A method, comprising:
 updating, by a device comprising a processor, a tree structure with a first operational parameter of a first base station device;
 selecting, by the device, an optimization module from optimization modules of a self organizing network plug-in based on the first operational parameter;
 activating, by the device, the optimization module resulting in an activated optimization module;
 modifying, by the device, the first operational parameter, based on the activated optimization module, resulting in a modified operational parameter; and
 updating, by the device, the tree structure with the modified operational parameter.

13. The method of claim 12, further comprising:
 sending, by the device, the modified operational parameter to the first base station device.

14. The method of claim 12, further comprising:
 collecting, by the device, the first operational parameter from the first base station device via a radio access network plug-in.

15. The method of claim 12, further comprising:
 identifying, by the device, a second base station device associated with the first base station device via a topology controller;
 updating, by the device, the tree structure with a second operational parameter from the second base station device; and
 modifying, by the device, the first operational parameter from the first base station device based on the second operational parameter of the second base station device.

16. The method of claim 12, further comprising:
 in response to receiving an instruction from a network controller indicating an event on a network on which the first base station device operates, deactivating, by the device, the activated optimization module.

17. The method of claim 12, further comprising:
 periodically updating, by the device, the tree structure.

18. A non-transitory machine-readable storage medium, comprising executable instructions that, when executed by a processor, facilitate performance of operations, comprising:
 updating a tree structure with an operational parameter of a base station device;
 selecting an optimization module from optimization modules of a self organizing network plug-in based on the operational parameter;
 activating the optimization module resulting in an activated optimization module;

modifying the operational parameter, based on the activated optimization module, resulting in a modified operational parameter;

updating the tree structure with the modified operational parameter; and transmitting the modified operational parameter to the base station device.

19. The non-transitory machine-readable storage medium of claim 18, wherein the operations further comprise:

collecting the operational parameter from the base station device via a radio access network plug-in that identifies the base station device using a topology controller of a service abstraction layer of a software defined networking platform.

20. The non-transitory machine-readable storage medium of claim 18, wherein the operations further comprise:

in response to receiving an instruction from a network controller indicating an event related to a network to which the base station device is connected, deactivating the activated optimization module.

* * * * *